(12) United States Patent
Kerler et al.

(10) Patent No.: US 8,464,550 B2
(45) Date of Patent: Jun. 18, 2013

(54) HEAT EXCHANGER WITH COLD ACCUMULATOR

(75) Inventors: Boris Kerler, Stuttgart (DE); Michael Kohl, Bietigheim (DE); Ralf Manski, Stuttgart (DE); Thomas Strauss, Notzingen (DE); Christoph Walter, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 1064 days.

(21) Appl. No.: 12/281,704

(22) PCT Filed: Feb. 26, 2007

(86) PCT No.: PCT/EP2007/001616
§ 371 (c)(1),
(2), (4) Date: Sep. 4, 2008

(87) PCT Pub. No.: WO2007/101572
PCT Pub. Date: Sep. 13, 2007

(65) Prior Publication Data
US 2009/0007593 A1    Jan. 8, 2009

(30) Foreign Application Priority Data
Mar. 9, 2006   (DE) .......................... 10 2006 011 327

(51) Int. Cl.
*F28D 7/10* (2006.01)
*F28D 7/00* (2006.01)
*F25B 39/02* (2006.01)
*F25B 39/00* (2006.01)

(52) U.S. Cl.
USPC ............... 62/406; 62/515; 165/176; 165/140; 165/10

(58) Field of Classification Search
USPC ................... 62/515, 406; 165/176, 140, 10
See application file for complete search history.

(56) References Cited

U.S. PATENT DOCUMENTS 2,115,714 A * 5/1938 Houdry et al. ................. 422/200
2,196,310 A * 4/1940 Kalin ................................. 62/89

(Continued)

FOREIGN PATENT DOCUMENTS

| CA | 2 286 567 A1 | 10/1999 |
| DE | 198 15 777 A1 | 10/1999 |

(Continued)

OTHER PUBLICATIONS

Office Action mailed Aug. 30, 2011 in related Japanese application No. 2008-557627 (3 pages).

*Primary Examiner* — Ljiljana Ciric
*Assistant Examiner* — Alexis Cox
(74) *Attorney, Agent, or Firm* — Foley & Lardner LLP

(57) ABSTRACT

The invention relates to a heat exchanger, in particular an evaporator (1), with a plurality of refrigerant-carrying pipes (6, 7) which are arranged next to one another and end in at least one collecting vessel (9), and with at least one cold accumulator (4), in which a cold accumulating medium is provided, wherein the evaporator (1) has two regions arranged parallel to each other, a first region (1') and a second region (1'), and the cold accumulator (4) is arranged in the second region (1'). In this case, the refrigerant-carrying pipes (6, 7) of the first and second regions (1',1') are arranged in line with one another and have a width corresponding to one another (b1, b2, b3), and the first and second regions (1', 1') have common, continuous corrugated rib.

19 Claims, 4 Drawing Sheets

U.S. PATENT DOCUMENTS

Figure 7:
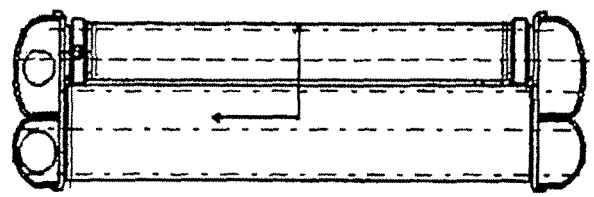

| | | | |
|---|---|---|---|
| 2,382,255 A * | 8/1945 | Pyzel | 165/140 |
| 2,966,780 A * | 1/1961 | Mills | 62/272 |
| 4,250,958 A * | 2/1981 | Wasserman | 165/46 |
| 4,817,704 A * | 4/1989 | Yamashita | 165/10 |
| 5,644,929 A * | 7/1997 | Tanaka et al. | 62/406 |
| 6,386,277 B1 * | 5/2002 | Wattelet et al. | 165/164 |
| 6,568,205 B2 * | 5/2003 | Bureau et al. | 62/515 |
| 6,691,527 B2 | 2/2004 | Bureau et al. | |
| 6,854,286 B2 * | 2/2005 | Bureau et al. | 62/244 |
| 6,854,513 B2 * | 2/2005 | Shirota et al. | 165/203 |
| 7,143,604 B2 | 12/2006 | Bureau et al. | |
| 7,156,156 B2 | 1/2007 | Haller et al. | |
| 7,251,946 B2 | 8/2007 | Bureau et al. | |
| 7,556,091 B2 * | 7/2009 | Heckt et al. | 165/202 |
| 8,037,929 B2 * | 10/2011 | Higashiyama | 165/153 |
| 8,122,943 B2 * | 2/2012 | Haller et al. | 165/10 |
| 8,146,652 B2 * | 4/2012 | Higashiyama et al. | 165/176 |
| 2005/0166632 A1 * | 8/2005 | Bureau et al. | 62/515 |
| 2006/0179876 A1 * | 8/2006 | Yagisawa | 62/515 |
| 2009/0025419 A1 * | 1/2009 | Kerler et al. | 62/524 |
| 2009/0095015 A1 * | 4/2009 | Kerler et al. | 62/524 |

FOREIGN PATENT DOCUMENTS

| | | |
|---|---|---|
| DE | 101 56 944 A1 | 7/2002 |
| DE | 101 56 882 A1 | 8/2002 |
| DE | 102 47 268 A1 | 5/2004 |
| DE | 102 59 572 A1 | 7/2004 |
| DE | 103 06 048 A1 | 9/2004 |
| EP | 1 424 531 A2 | 6/2004 |
| EP | 1 652 702 A1 | 5/2006 |
| EP | 1 657 088 A1 | 5/2006 |
| FR | 2 878 613 A1 | 6/2006 |
| JP | 2000-205777 A | 7/2000 |
| JP | 2002274165 A | 9/2002 |
| JP | 2004184071 A | 7/2004 |
| WO | WO 2004/035335 A1 | 4/2004 |
| WO | WO 2006/053721 A1 | 5/2006 |

* cited by examiner

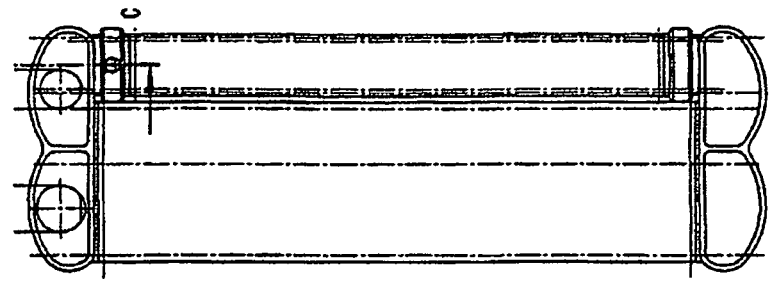
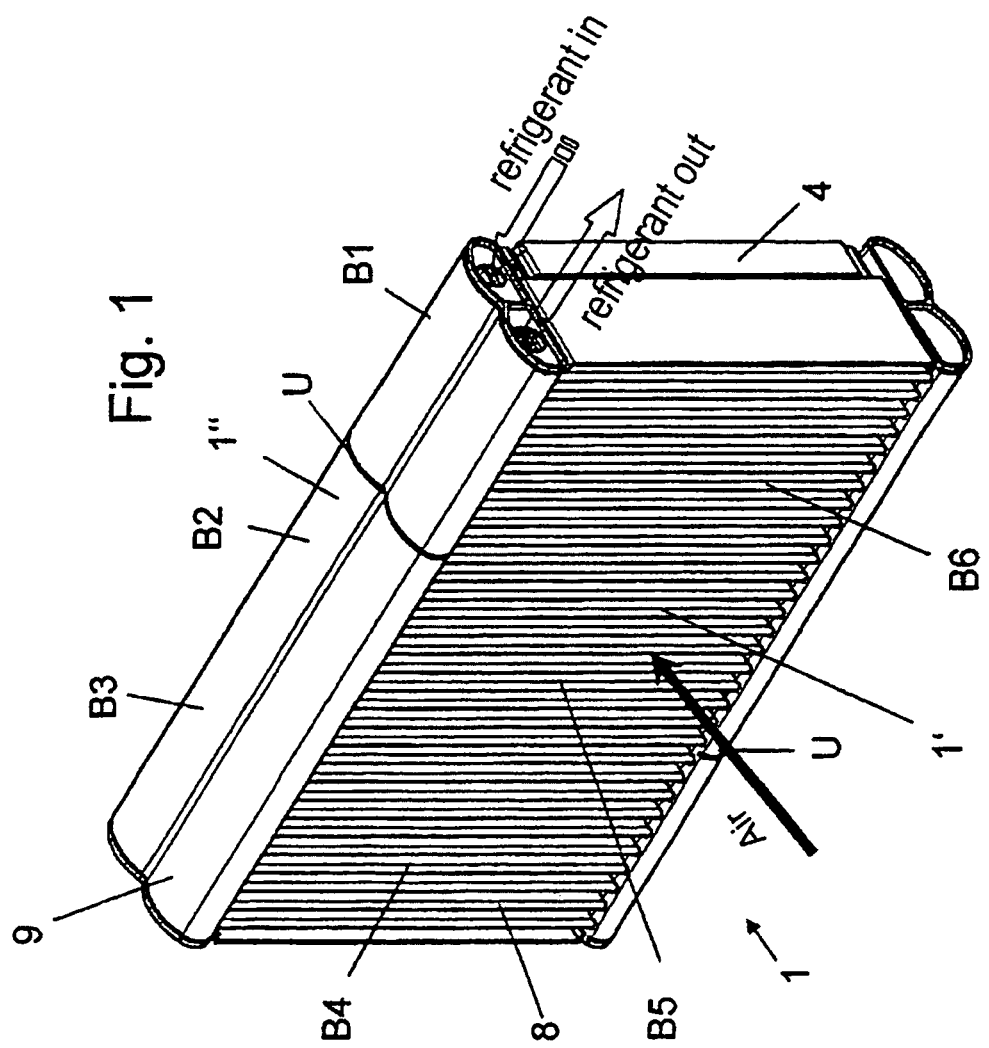

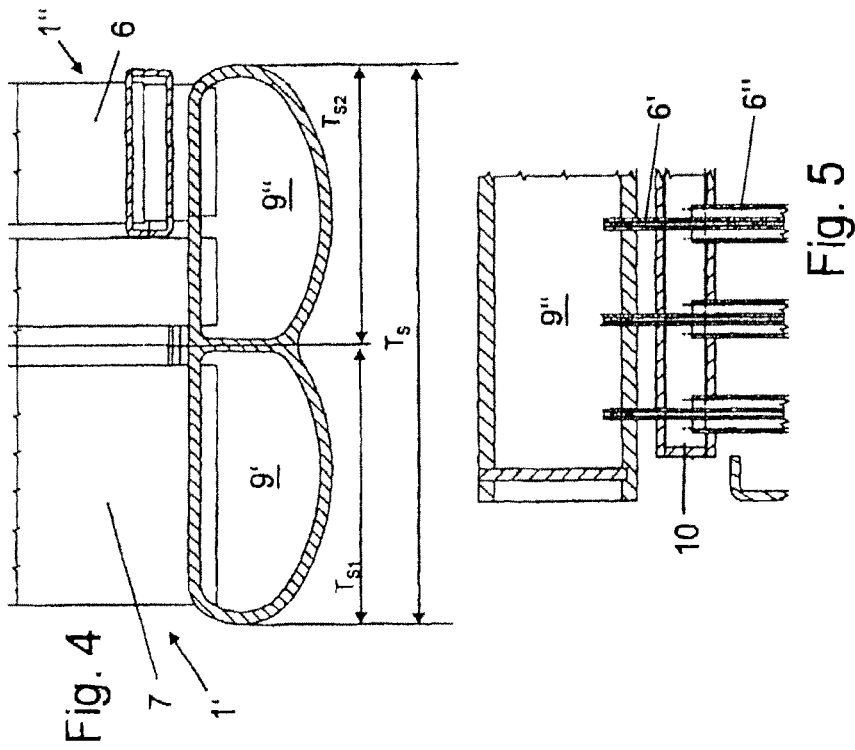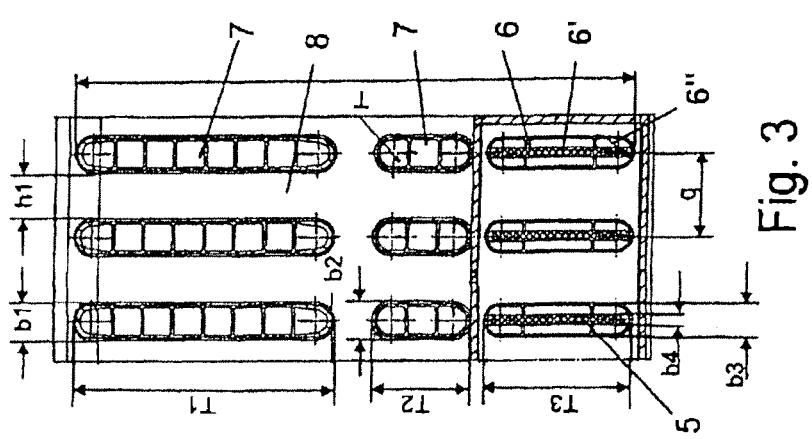

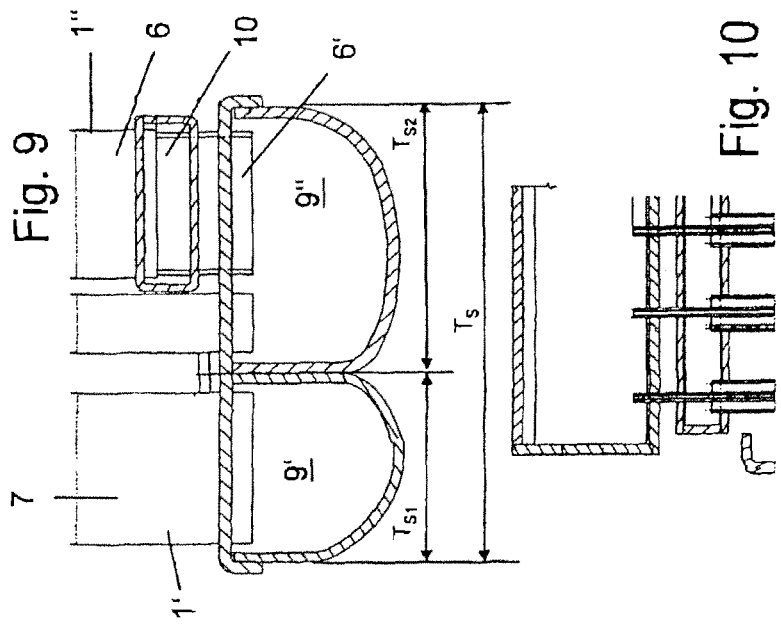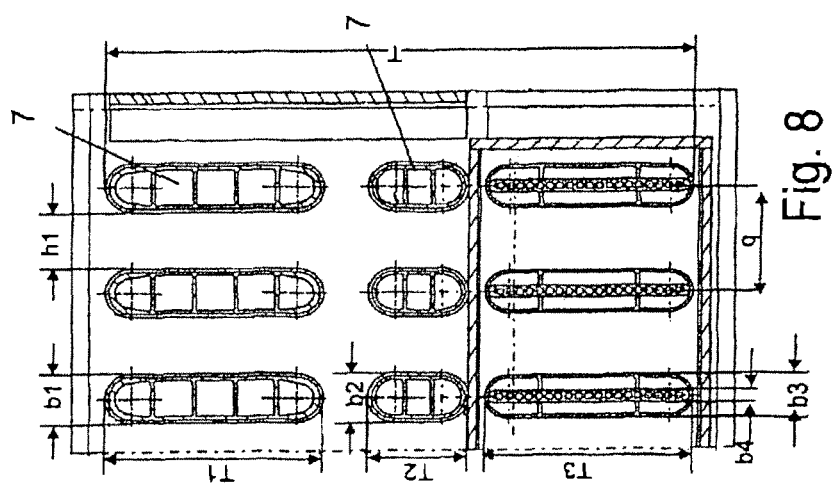

HEAT EXCHANGER WITH COLD ACCUMULATOR

The invention relates to a heat exchanger, in particular, a heat exchanger for a motor vehicle air conditioning system, with a cold accumulator.

An objective of a motor vehicle manufacturer is to reduce the fuel consumption of the vehicle. One measure for reducing the fuel consumption is to switch off the engine when the vehicle is temporarily at a standstill, for example when it has stopped at a traffic light. This temporary switching off of the engine is also referred to as idle stop mode. This measure is already used in contemporary low-consumption vehicles such as, for example, in what is referred to as a three liter vehicle. In vehicles which have idle stop operating mode, the engine is switched off for approximately 25-30% of the driving time in town center traffic.

This is the reason for which such vehicles are often not equipped with an air conditioning system because when the engine is stationary, a compressor which is necessary for an air conditioning system cannot be driven either, with the result that in the idle stop mode an air conditioning system cannot make available the necessary refrigerating capacity. On the one hand, this also solves the problem that when the air conditioning system is switched on, the engine continues to run when the vehicle stops, but this results in a higher fuel consumption.

DE 101 56 944 A1 discloses an air conditioning system for a motor vehicle having a compressor and evaporator which are arranged in a refrigerant circuit and have the purpose of cooling air which is to be conditioned for the passenger compartment, which air conditioning system has a second evaporator for cooling the air, which evaporator additionally contains a cold accumulating medium, and in this context the air which is to be conditioned can either be conducted through each evaporator individually or through both evaporators jointly. According to one alternative embodiment, instead of the second evaporator, the evaporator is embodied in such a way that it has two partial regions, and contains a cold accumulating medium in one of the two partial regions, and in this context the air to be conditioned can either be conducted through each evaporator individually or through both evaporators jointly. In this context, the pipes in which the refrigerant flows through the evaporator can be embodied as multi-ducts, with one or more of the ducts being filled with the cold accumulating medium.

Taking this prior art as a starting point, the object of the invention is to make available an improved heat exchanger.

According to the invention, a heat exchanger, in particular an evaporator for a motor vehicle air conditioning system, is provided for cooling air which is to be conditioned for the passenger compartment, having a plurality of refrigerant-carrying pipes which are arranged one next to the other and which end in at least one collecting vessel, and having at least one cold accumulator in which a cold accumulating medium is provided, in which case the evaporator has two first and second regions which are arranged parallel to one another, and the first region is embodied essentially in accordance with a conventional heat exchanger without a cold accumulator, and the cold accumulator is arranged in the second region. In this context, the refrigerant-carrying pipes of the first and second regions which are arranged in line with one another have a corresponding width, and the first and second region have common, continuous corrugated fins, which width has a favorable effect in terms of manufacturing costs. The integrated embodiment of a heat exchanger with integrated accumulator elements is very cost effective compared to known secondary circuits or electrically operated refrigerant compressors. In principle, the heat exchanger can be configured in such a way that by virtue of the fact that the installation space required essentially corresponds, a conventional heat exchanger can easily be replaced with the effect that no significant reconfigurations around the heat exchanger are necessary.

In this context, at least a partial stream of the refrigerant stream can preferably flow through the second region, and said refrigerant stream also flows through at least part of the first region. In this preferred configuration, the division of the first and second region differs from the division with respect to the flow profile of the refrigerant, which is predefined by the collecting vessels or their subdivision.

The refrigerant stream is particularly preferably divided in the heat exchanger, wherein a first partial stream flows through a first part of the first region and subsequently a second part of the first region, and a second partial stream flows through the second region and subsequently the second part of the first region. With such a configuration, only one expansion element is necessary. In addition, only one feedline for refrigerant into the heat exchanger has to be provided. In principle, the completely separated refrigerant streams can also flow through the heat exchanger in the individual regions, i.e. the different refrigerant streams are fed in and discharged separately. In this context, it is, if appropriate, also possible to provide different expansion elements for the individual refrigerant streams. Likewise, in particular in conjunction with separate expansion elements, it is possible to regulate the refrigerant streams separately. However, for reasons of cost, a configuration which requires one expansion element and one feed line and one discharge line for the entire refrigerant stream is preferred. In this context, the refrigerant stream is preferably divided in the heat exchanger, in particular in the first block through which the flow passes, while in subsequent blocks the refrigerant streams can be mixed and divided again. The division of the refrigerant stream is preferably carried out in the first collecting vessel, i.e. in the first block, but this is not necessarily the case. Pipes from both a part of the first region and from the second region end in the collecting vessel in which the refrigerant stream is divided.

The first and second regions of the evaporator preferably each extend over the entire width thereof. In this context, the second region in which the cold accumulator is provided is preferably arranged on the air outflow side of the first region. The refrigerant inlet is preferably located in this region which is arranged on the air outflow side, with the refrigerant preferably being divided into partial streams which flow through the second region and a directly adjacent part of the first region.

The pipes of the second region and at least some of the pipes of the first region, which is embodied in a conventional way, particularly preferably end in, in each case, a common partial region of the collecting vessels or common collecting vessels which are each embodied separately from the other partial region or the collecting vessel in which the row of pipes end, said pipes being arranged spaced apart from the pipes with a cold accumulating element or cold accumulating elements. Such an arrangement permits, on the one hand, a sufficient refrigerating capacity during normal operation and, on the other hand, that the cold accumulating is charged automatically during normal operation.

At least one refrigerant-carrying pipe is preferably arranged in at least one cold accumulating element. In this context, the cold accumulating elements can be connected to one another, in particular by means of at least one collecting vessel. The pipes with a cold accumulating element or cold accumulating elements form a cold accumulating region.

The flow through the two regions, that is to say the cold accumulating region and the "normal" region, preferably occurs in a serial fashion so that only one expansion element is provided for the two regions.

If the refrigerant-carrying pipe is arranged in the cold accumulating element, said pipe can be plugged in to the cold accumulating element which is filled with the cold accumulating medium or else can be embodied directly in it, in which case the cold accumulating medium preferably surrounds the refrigerant on all sides, and in particular a pipe-in-pipe arrangement is provided.

The cold accumulating element can also be formed by a pipe with a U-shaped cross section, in particular with a plurality of chambers. In this context, the internal dimensions of the cold accumulating element preferably correspond to the external dimensions of the refrigerant-carrying pipe in the corresponding region, with the result that the pipes bear one against the other over surfaces. A single-piece configuration, for example formed by a correspondingly extruded pipe with at least two ducts, is also possible.

The refrigerant-carrying pipe and the cold accumulating medium-containing pipe is preferably embodied as a double-walled flat pipe when it is arranged completely inside the cold accumulating element, in which case the refrigerant is located in the central region, and the cold accumulating medium is located in the outer region. According to a further preferred embodiment, the double-walled flat pipe has webs which connect the flat pipe located on the outside to the flat pipe located on the inside. Since the cold accumulator has direct contact with the air, very good dynamics result during the exchange of heat so that if necessary, i.e. in the idle stop mode, the entire refrigerating capacity is immediately available.

It is also possible for the pipe which contains the cold accumulating medium not to completely surround the refrigerant-carrying pipe. In this context, preferably precisely three sides of the refrigerant-carrying pipe are surrounded by the pipe which contains the cold accumulating medium. The pipe which contains the cold accumulating medium can be embodied here with a U-shaped cross section and can surround the refrigerant-carrying pipe partially, i.e. over part of its circumference, said pipe being preferably a flat pipe, and preferably the greater part of the refrigerant-carrying pipe is arranged in the interior of the pipe which contains the cold accumulating medium.

The refrigerant-carrying pipes of the second region preferably end in a collecting vessel which is embodied separately from and only over one or more overflow openings with a collecting vessel of the first region.

The cold accumulating medium-carrying pipes or ducts preferably end in a cold accumulating medium collecting vessel through which the refrigerant-carrying pipes or ducts, which end in a separate collecting vessel, project. In this context, the cold accumulating medium collecting vessel can also be embodied in one piece with the refrigerant collecting vessel, with a corresponding dividing wall being provided in the interior of the vessel. The provision of a common cold accumulating medium collecting vessel permits the individual cold accumulating elements to be charged with the cold accumulating medium, with the result that simple and rapid charging of the cold accumulating medium-carrying pipes or ducts is possible. In addition, assembly can be made easier by virtue of the preferably single-piece configuration of the cold accumulator when the refrigerant-carrying pipes and the cold accumulator elements are embodied separately. It is therefore also possible to make available an equalization space for, in particular, temperature-related changes in volume of the refrigerant. In addition, this permits a compact design of the second region.

The heat exchanger preferably has a number of blocks through which refrigerant can flow in different directions, in which case at least one row which is transverse with respect to the direction of air flow, i.e. in the lateral direction of the heat exchanger, of adjacent blocks comprises some of the pipes of the first region and at least some of the pipes of the second region, and at least a second row of adjacent blocks which comprises some of the other pipes of the first region but none of the pipes of the second region is provided.

The heat exchanger preferably has two to four, in particular three, blocks, and the second region has one to six blocks, in particular two to four blocks. A configuration according to which the rows of blocks each have the same number of blocks and the flow through the blocks is in the countercurrent mode, in which case the block width of blocks which are adjacent in the direction of air flow correspond to one another, is particularly preferred. However, any other embodiments are also possible.

The pipes through which the refrigerant flows are preferably flat pipes which are welded, folded, deep-drawn from disks or extruded and they may either have rounded corners or be polygonal in design. However, it is also possible, for example, for oval pipes or round pipes to be used. Materials which are possible are, in particular, aluminum and aluminum alloys, but it is also possible to use any other desired suitable materials which are good conductors of heat.

The cold accumulator is preferably composed of aluminum, in particular an aluminum which is coated on the inside and/or outside (aluminum also being understood to refer to an aluminum alloy), if appropriate also copper, a copper-zinc alloy, synthetic resin or plastic. An aluminum container has the advantage that it can be soldered without difficulty to the other parts of the evaporator. Said vessel is preferably an extruded flat pipe which has a plurality of ducts, some of the ducts containing the cold accumulating medium and the rest of the ducts containing the refrigerant. However, this can also be embodied as a plurality of parts.

The latent medium or accumulating medium is preferably a PCM material (phase change material) which preferably contains congruently melting media, in particular decanol, tetradecane, pentadecane or hexadecane, $LiClO_3 3H_2O$, aqueous salt solutions or organic hydrates or is formed therefrom. Nucleating agents, which accelerate the formation of nuclei, can also be provided in the accumulating medium.

The phase conversion temperature of the accumulating medium is preferably in a range from 0° C. to 30° C., preferably from 1° C. to 20° C., in particular from 2° C. to 15° C., in particular preferably from 4° C. to 12° C.

In the interior of the cold accumulating element it is possible to provide—irrespective of whether said cold accumulating element entirely or only partially surrounds the refrigerant-carrying pipe—inserts such as fin plates, preferably composed of aluminum but other metals or plastics are also suitable, or other turbulence inserts such as nonwovens or knitted fabrics, for example composed of plastic or metal, or foams, for example metal foams or plastic foams, are provided. The inserts serve to improve the transfer of heat and to increase the internal surface in order to speed up the formation of nuclei in the accumulating medium.

In the case of a collecting vessel of symmetrical design or of a symmetrical arrangement of two collecting vessels, the heat exchanger preferably has the following dimensions (reference should be made to FIG. 3 to 5 with regard to the dimensions):

The total depth T of the heat exchanger is preferably 25 to 200 mm, in particular 35 to 80 mm, particularly preferably 60+/−10 mm. The constructional depths Ts1 and Ts2 are correspondingly half as large (symmetrical configuration of the collecting vessel).

The width b3 of the flat pipes in the cold accumulating region depends on the necessary accumulating medium and is preferably 2.0 to 6.0 mm, in particular 3.0 to 5.0 mm. It corresponds to the width b1 and b2 of the "normal" flat pipes.

The constructional depth T3 of this cold accumulating flat pipe depends on how much accumulating medium is required and how much total constructional depth T is available. The constructional depth T3 is preferably 5 to 70 mm, in particular 10 to 30 mm.

The width b4 of the flat pipes is preferably is 0.6 to 2.5 mm, in particular 0.9 to 1.5 mm.

The constructional depth T1 of the row of flat pipes which is spaced apart from the cold accumulating region depends essentially on the total constructional depth T, the latter preferably being 10 to 100 mm, in particular 15 to 40 mm. Furthermore, for the symmetrical configuration of the collecting vessel or vessels, the following applies: T2+T3<T1.

The transverse division q of all the rows of flat pipes of the evaporator is preferably 5 to 20 mm, in particular preferably 7 to 13 mm. It corresponds preferably to the transverse division of the second row of flat pipes of the evaporator.

The height h1 of the corrugated fin is preferably 3 to 18 mm, in particular 4 to 10 mm. The evaporator in the region of the cold accumulator has flat pipes which contain the cold accumulating medium in the outer cold accumulating medium ducts, having widths b3 of, preferably, 2.0 to 10.0 mm, in particular of 3.0 to 8.0 mm. The width b4 of the flat pipes which are arranged therein and in whose refrigerant ducts the refrigerant flows is preferably 0.6 to 2.5 mm, in particular 0.9 to 1.5 mm.

The constructional depth T3 of the flat pipes of the evaporator in the region with the cold accumulator is preferably 5 to 70 mm, in particular preferably 10 to 30 mm.

The height of the cold accumulating medium collecting vessel is preferably 3 to 25 mm, in particular 3 to 15 mm, but preferably as small as possible in order to save installation space and to keep the cross section through which air flows as large as possible.

In the case of a collecting vessel which is of asymmetrical design or in the case of an asymmetrical arrangement of two collecting vessels, the heat exchanger preferably has the following dimensions (reference should be made to FIGS. 8 to 10 with regard to the dimensions):

The total depth T of the heat exchanger is preferably 25 to 200 mm, in particular 35 to 80 mm, particularly preferably 60+/−10 mm. The constructional depth Ts1 is preferably 10 to 80 mm, in particular 15 to 40 mm, and the constructional depth Ts2 is preferably 15 to 120 mm, in particular 20 to 60 mm.

The width b3 of the flat pipes in the cold accumulating region depends on the necessary accumulating medium and is preferably 2.0 to 6.0 mm, in particular 3.0 to 5.00 mm. It corresponds to the width b1 and b2 of the "normal" flat pipes.

The constructional depth of this cold accumulating flat pipe depends on how much storage medium is required and how much total constructional depth T is available. T3 is preferably 5 to 70 mm, in particular 10 to 30 mm.

The width b4 of the flat pipe is preferably 0.6 to 2.5 mm, in particular 0.9 to 1.5 mm.

The constructional depth T1 of the row of flat pipes which is spaced apart from the cold accumulating region depends essentially on the total constructional depth T and it can preferably be 10 to 80 mm, in particular 15 to 40 mm. Furthermore, the following applies to the asymmetrical configuration of the collecting vessel or vessels: T2+T3>T1.

The transverse division q of all the rows of flat pipes of the evaporator is preferably 5 to 20 mm, in particular preferably 7 to 13 mm. It preferably corresponds to the transverse division of the second row of flat pipes of the evaporator.

The height h1 of the corrugated fin is preferably 3 to 18 mm, in particular 4 to 10 mm.

The evaporator in the region of the cold accumulator has flat pipes which contain the cold accumulating medium in the outer cold accumulating medium ducts, having widths b3 of preferably 2.0 to 10.0 mm, in particular of 3.0 to 8.0 mm. The width b4 of the flat pipes which are arranged in the latter and in whose refrigerant ducts the refrigerant flows is preferably 0.6 to 2.5 mm, in particular 0.9 to 1.5 mm.

The constructional depth T3 of the flat pipes of the evaporator in the region with the cold accumulator is preferably 5 to 70 mm, in particular preferably 10 to 30 mm.

The height of the cold accumulating medium collecting vessel is preferably 3 to 25 mm, in particular 3 to 15 mm, but is preferably as small as possible in order to save installation space and to keep the cross section through which air flows as large as possible.

Figure 6:
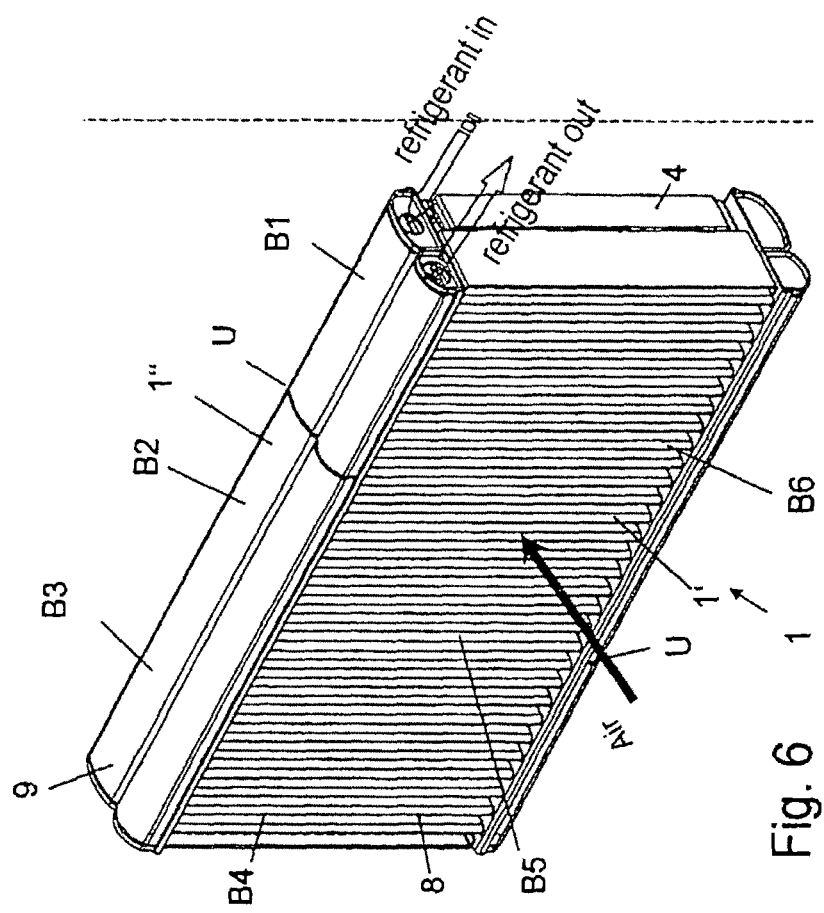

The invention will be explained in detail in the text which follows on the basis of an exemplary embodiment with variants and partially with reference to the drawing, in which:

FIG. 1 shows a perspective view of a heat exchanger according to the first exemplary embodiment, FIG. 2 shows a side view of the heat exchanger from FIG. 1, FIG. 3 is a detail illustration of a cross section through the flat pipes of the heat exchanger in FIG. 1, FIG. 4 is a detail illustration of a cross section through the lower collecting vessel of the heat exchanger in FIG. 1, FIG. 5 is a detail illustration of a section along the upper collecting vessel and the ends of the flat pipes in the cold accumulating region of the heat exchanger in FIG. 1, FIG. 6 is a perspective view of a variant of the heat exchanger in FIG. 1, FIG. 7 is a side view of the heat exchanger in FIG. 6, FIG. 8 is a detail illustration of a cross section through the flat pipes of the heat exchanger in FIG. 6, FIG. 9 is a detail illustration of a cross section through the lower collecting vessel of the heat exchanger in FIG. 6, and FIG. 10 is a detail illustration of a section along the upper collecting vessel and the ends of the flat pipes in the cold accumulating region of the heat exchanger in FIG. 6.

A motor vehicle air conditioning system for conditioning the passenger compartment of the motor vehicle having a refrigerant circuit (in this case R134a but it is also possible, for example, to use $CO_2$ or some other refrigerant), of which air conditioning system only the evaporator 1 is illustrated, has, in order to make available sufficient refrigerating capacity even when the engine is stopped, at least over a short time period, a cold accumulator 4 which is embodied integrated into the evaporator 1 and is composed of a plurality of cold accumulating elements 5 which are charged with a cold accumulating medium and which are cooled during normal operation by the refrigerant which flows through the evaporator 1. The cold accumulator elements 5 are formed by regions of specially configured flat pipes 6 composed of aluminum, more details of which will be given later. Decanol is used in the present case as the cold accumulating medium. Alternatively, for example, tetradecane, pentadecane or hexadecane are also suitable.

The normal direction of air flow is indicated in FIG. 1 by an arrow, as is also the inflow and outflow of the refrigerant. As is apparent from FIGS. 1 and 2, the refrigerant enters the evaporator 1 on the air outflow side on the narrow side of the upper collecting vessel 9 (region 9") and leaves it on the same narrow side in the air inflow side region of the collecting vessel 9 (region 9').

The evaporator 1 has, in the relatively large, air inflow side part, a region 1' with two rows of flat pipes 7, here with different cross sections, and corrugated fins 8 arranged between them. The flat pipes 7 each end in a single-piece collecting vessel 9, which is of symmetrical design with respect to its cross section, in different collecting and distributor regions which are separated by a dividing wall which extends in the width direction of the evaporator 1.

The other region of the evaporator 1, specifically the cold accumulator region 1" which the cold accumulating elements 5 are provided is formed by the relatively small, air outflow side part of the evaporator 1. A row of cold accumulating flat pipes 6 and likewise corrugated fins 8 are arranged in the cold accumulating region 1". The cold accumulating flat pipes 6 end in the same collecting and distributing region as the directly adjacent row of flat pipes 7, and this row of flat pipes 7 is made narrower than the row of flat pipes which is arranged on the air inflow side and is spaced apart from the cold accumulating flat pipes 6.

The cold accumulating flat pipes 6 in the cold accumulating region 1" and the conventional flat pipes 7 in the region 1' are, as is apparent in particular from FIG. 3, arranged in such a way that in all three rows of flat pipes in each case one flat pipe is in line with the two other flat pipes of the other rows in the direction of air flow. In this context, the flat pipes 6 and 7 are embodied in such a way that they correspond to one another in their widths b1, b2 and b3. This is optimum with regard to the flow resistance for the air which flows through the evaporator 1. In addition, this configuration permits the corrugated fins 8 to be of continuous design, i.e. a corrugated fin extends over both evaporator regions 1' and 1".

The constructional depth T1 of the air inflow side row of flat pipes is larger than the constructional depth T2 of the adjacent row of flat pipes and also larger than the constructional depth T3 of the row of cold accumulating flat pipes arranged on the air outflow side, in which case T1 is larger than T2 plus T3 so that said symmetrical configuration of the collecting vessels 9 is possible.

The cold accumulating flat pipes 6 have an essentially double-walled design with a plurality of refrigerant ducts 6' and cold accumulating medium ducts 6", with the refrigerant ducts 6' being arranged on the inside (see FIG. 3). In this context, the cold accumulating flat pipes 6 are arranged in such a way that the cold accumulating medium ducts 6" which serve as cold accumulating elements 5 each end in one of two cold accumulating medium collecting vessels 10, with the result that the cold accumulating element 5 has just a single cavity, which, apart from an equalization space, is charged completely with the cold accumulating medium. The charging is carried out via an opening in the cold accumulating medium collecting vessel 10 in a single operation. After the charging has taken place, the opening is permanently closed, reliably preventing unauthorized opening.

According to a variant which is not illustrated in the drawing, elements such as in this case a plastic nonwoven, which serve to improve the transfer of heat and to make the inner surface larger in order to speed up the formation of crystals of the latent medium, are provided in the interior of the continuous cavity of the cold accumulating elements.

The refrigerant ducts 6' each project with their ends through the corresponding cold accumulating medium collecting vessels 10 and each end in the collecting vessel 9.

There is a flow through the region 1' of the evaporator 1 such that the refrigerant stream is deflected twice in the width of the evaporator (cf. deflection points U in FIG. 1 at each of which dividing walls are provided in the collecting vessels 9) before it is deflected from a partial region (on the right in FIG. 2) in one of the collecting vessels 9 into another partial region (on the left in FIG. 3) of said collecting vessel 9 in the depth direction counter to the direction of air flow. It is also deflected twice in the width direction in the air inflow side region of the evaporator 1, here in each case as an extension of the deflection points U of the air outflow side partial region. The evaporator therefore has six blocks B1 to B6 with, in each case, three blocks being provided in the width direction of the evaporator 1 (i.e. the blocks B1 to B3 are provided in the row through which the flow passes first and the blocks B4 to B6 are provided in the row through which the flow passes last) and the flow passes through the individual blocks B1 to B6 of the two rows of blocks in the crosscurrent-countercurrent mode, in which case the flow here is from top to bottom through the blocks B1, B3 and B5 and from bottom to top through the blocks B2, B4 and B6.

As is apparent from FIG. 4, the refrigerant stream in the air inflow side partial region of the collecting vessel 9 (region 9") is distributed onto the flat pipes 6 of the cold accumulating region 1' and the row of flat pipes 7 which are arranged adjacent thereto and through which there is a parallel flow, i.e. the cold accumulating region 1" is, together with the adjacent row of flat pipes, part of the blocks B1 to B3.

Owing to the previously described design of the evaporator 1, only one expansion element is necessary. The refrigerant circuit is regulated in a manner known per se and this process is not made more difficult by the provision of the cold accumulating elements which are automatically charged by the refrigerant during normal operation of the air conditioning system.

The variant of the first exemplary embodiment which is illustrated in FIGS. 6 to 10 differs from the first exemplary embodiment in particular in that in each case two upper and two lower collecting vessels 9', 9" are provided as collecting vessels 9 instead of the corresponding collecting vessels 9 (regions 9', 9") which are embodied in one piece and which are additionally not embodied in a mirror-inverted fashion. In this context, the constructional depth TS2 of the collecting vessel 9" into which both the row of cold accumulating flat pipes and the adjacent row of flat pipes opens is larger than the constructional depth TS1 of the other collecting vessel 9' (see FIG. 9). Apart from the different configuration with respect to the constructional depths TS1 and TS2 with which other constructional depths of the rows of flat pipes are also associated, and the different configuration of the collecting vessels 9, the variant corresponds to the first exemplary embodiment with the effect that identical and identically acting components in the drawing are provided with the same reference symbols as those used for the previously described first exemplary embodiment.

The asymmetrical configuration, such as is provided in the variant in the first exemplary embodiment—irrespective of whether it has one or two separately embodied collecting vessels—permits better equalization of the necessary flow area for the refrigerant, i.e. in the asymmetrical case it is possible to provide more cold accumulating medium, that is to say it is also possible to store more cold.

Instead of the previously described design, the collecting vessels can also be constructed in some other way, in particular with a plate design.

All the variants are independent of the refrigerant (R134a, R744), of the design of the collectors (bent collector, plate design) and of the connection of the blocks in the serial evaporator (for example 2, 3 or 4 block connection).

The invention claimed is:

1. A heat exchanger comprising:
   a first plurality of pipes configured to allow flow of refrigerant therethrough;
   a second plurality of pipes configured to allow flow of refrigerant therethrough;
   a plurality of cold accumulating pipes, each cold accumulating pipe comprising a refrigerant duct configured to allow flow of refrigerant therethrough, and a cold accumulating medium cavity configured to hold a cold accumulating medium, wherein, for each cold accumulating pipe, an elongated length of the cold accumulating medium cavity runs alongside a length of the refrigerant duct in a parallel manner;
   at least one upper collecting vessel comprising a first upper collecting vessel region and a second upper collecting vessel region; and
   at least one lower collecting vessel comprising a first lower collecting vessel region and a second lower collecting vessel region,
   wherein the first plurality of pipes, the second plurality of pipes, and the cold accumulating pipes are arranged in parallel,
   wherein ends of the first plurality of pipes are connected in a fluid-transmitting manner to the first upper collecting vessel region and the first lower collecting vessel region,
   wherein ends of the second plurality of pipes and ends of the refrigerant ducts are connected in a fluid-transmitting manner to the second upper collecting vessel region and the second lower collecting vessel region, and
   wherein the first plurality of pipes, the second plurality of pipes, and the plurality of cold accumulating pipes have a common width, and the first plurality of pipes is directly adjacent to the second plurality of pipes, the second plurality of pipes is directly adjacent to both the plurality of cold accumulating pipes and the first plurality of pipes, the plurality of cold accumulating pipes is directly adjacent to the second plurality of pipes but is not directly adjacent to the first plurality of pipes.

2. The heat exchanger of claim 1, further comprising a plurality of corrugated fins, at least one of the plurality of corrugated fins being disposed continuously between two of the first plurality of pipes, two of the second plurality of pipes, and two of the plurality of cold accumulating pipes.

3. The heat exchanger of claim 1, wherein:
   the first plurality of pipes, the first upper collecting vessel region, and the first lower collecting vessel region are located on an air inflow side of the heat exchanger, and
   the second plurality of pipes, the plurality of cold accumulating pipes, the second upper collecting vessel region, and the second lower collecting vessel region are located on an air outflow side of the heat exchanger.

4. The heat exchanger of claim 1, wherein the first plurality of pipes is separated from the plurality of cold accumulating pipes by the second plurality of pipes.

5. The heat exchanger of claim 1, wherein each of the cold accumulating pipes is a double-walled pipe, the refrigerant duct being located in a central region of the cold accumulating pipe, and the cold accumulating medium cavity being located in an outer region of the cold accumulating pipe.

6. The heat exchanger of claim 1, wherein the first plurality of pipes is arranged in a first row, the second plurality of pipes is arranged in a second row, and the plurality of cold accumulating pipes are arranged in a third row.

7. The heat exchanger of claim 1, further comprising a cold accumulating medium collecting vessel, wherein:
   ends of the cold accumulating medium cavities are connected in a fluid-transmitting manner to the cold accumulating medium collecting vessel, and
   the refrigerant ducts extend through the cold accumulating medium collecting vessel before connecting to the second upper collecting vessel region.

8. The heat exchanger of claim 1, wherein:
   the heat exchanger includes a plurality of blocks configured to allow flow of refrigerant in different directions, the plurality of blocks including a first row of adjacent blocks and a second row of adjacent blocks,
   the first row of adjacent blocks comprises the first plurality of pipes, and
   the second row of adjacent blocks comprises the second row of pipes and the plurality of cold accumulating pipes.

9. The heat exchanger of claim 8, wherein the first row of adjacent blocks includes two to four blocks, and the second row of adjacent blocks includes two to four blocks.

10. The heat exchanger of claim 9, wherein the first row of adjacent blocks includes three blocks, and the second row of adjacent blocks includes three blocks.

11. The heat exchanger of claim 1, further comprising the cold accumulating medium, wherein a phase conversion temperature of the cold accumulating medium is in a range from 0° C. to 30° C.

12. The heat exchanger of claim 1, further comprising the cold accumulating medium, wherein a phase conversion temperature of the cold accumulating medium is in a range from 2° C. to 15° C.

13. The heat exchanger of claim 1, further comprising the cold accumulating medium, wherein a phase conversion temperature of the cold accumulating medium is in a range from 4° C. to 12° C.

14. The heat exchanger of claim 1, wherein at least one insert is arranged in at least one of the plurality of cold accumulating pipes.

15. The heat exchanger of claim 1, wherein the at least one upper collecting vessel is formed in a single-piece, the first upper collecting vessel region being separated from the second upper collecting vessel region by a dividing wall.

16. The heat exchanger of claim 1, wherein the at least one lower collecting vessel is formed in a single-piece, the first lower collecting vessel region being separated from the second lower collecting vessel region by a dividing wall.

17. The heat exchanger of claim 1, wherein the at least one upper collecting vessel is formed of first and second upper collecting vessels, the first upper collecting vessel region being located in the first upper collecting vessel, and the second upper collecting vessel region being located in the second upper collecting vessel.

18. The heat exchanger of claim 1, wherein the at least one lower collecting vessel is formed of first and second lower collecting vessels, the first lower collecting vessel region being located in the first lower collecting vessel, and the second lower collecting vessel region being located in the second lower collecting vessel.

19. The heat exchanger of claim 1, wherein the direction of the flow of air through the heat exchanger is perpendicular to the flow of the refrigerant through the first and second plurality of pipes.

* * * * *